(12) United States Patent
Bach et al.

(10) Patent No.: US 12,155,184 B2
(45) Date of Patent: Nov. 26, 2024

(54) GRIPPER FOR AUTOMATED WIRING

(71) Applicant: RITTAL GMBH & CO. KG, Herborn (DE)

(72) Inventors: Michael Bach, Siegbach (DE); Kevin Jung, Haiger (DE); Andreas Michael Bächler, Haiger (DE)

(73) Assignee: RITTAL GMBH & CO. KG, Herborn (DE)

( * ) Notice: Subject to any disclaimer, the term of this patent is extended or adjusted under 35 U.S.C. 154(b) by 521 days.

(21) Appl. No.: 17/437,070

(22) PCT Filed: Jan. 17, 2020

(86) PCT No.: PCT/DE2020/100034
§ 371 (c)(1),
(2) Date: Sep. 8, 2021

(87) PCT Pub. No.: WO2020/187349
PCT Pub. Date: Sep. 24, 2020

(65) Prior Publication Data
US 2022/0166197 A1    May 26, 2022

(30) Foreign Application Priority Data
Mar. 15, 2019   (DE) .................... 10 2019 106 710.3

(51) Int. Cl.
*H02B 3/00*     (2006.01)
*B25J 15/00*    (2006.01)
(Continued)

(52) U.S. Cl.
CPC ............ *H02B 3/00* (2013.01); *B25J 15/0004* (2013.01); *B25J 15/0033* (2013.01); *B25J 15/0253* (2013.01); *H02B 1/202* (2013.01)

(58) Field of Classification Search
CPC ......................... B25J 15/0004; B25J 15/0033; B25J 15/0253; H01R 43/28; H02B 1/202; H02B 3/00
See application file for complete search history.

(56) References Cited

U.S. PATENT DOCUMENTS

| 4,617,731 A | 10/1986 | Carrell et al. |
| 6,079,097 A | 6/2000 | Henrici et al. |

(Continued)

FOREIGN PATENT DOCUMENTS

| BE | 1019651 A5 | 9/2012 |
| DE | 3606059 A1 | 8/1987 |

(Continued)

OTHER PUBLICATIONS

International Search Report (in English and German) and Written Opinion of the ISA (in German) issued in PCT/DE2020/100034, mailed Jun. 25, 2020; ISA/EP.

*Primary Examiner* — Minh N Trinh
(74) *Attorney, Agent, or Firm* — Harness, Dickey & Pierce, P.L.C.

(57) ABSTRACT

A gripper for the automated wiring of electrical components of an electrical switchgear, the gripper having at least two gripper fingers, wherein the gripper fingers delimit between them a cable guide corridor, the passage cross-section of which is bounded at a distal end of the gripper fingers by opposing gripper jaws of the gripper fingers and, with respect to the distal end, is bounded further proximally by opposing cable drives of the gripper fingers, the two gripper fingers being adjustable with respect to one another in an adjustment direction which corresponds to a cross-sectional direction of the passage cross-section in order to vary the passage cross-section via a linear adjustment unit. A corresponding robot and a corresponding method are further described.

9 Claims, 4 Drawing Sheets

(51) Int. Cl.
*B25J 15/02* (2006.01)
*H02B 1/20* (2006.01)

(56) References Cited

U.S. PATENT DOCUMENTS

| | | |
|---|---|---|
| 8,113,557 B2 | 2/2012 | Kirst et al. |
| 8,646,822 B2 * | 2/2014 | Braun .................... H01R 43/20 |
| | | 294/207 |
| 9,769,961 B2 | 9/2017 | Bach et al. |
| 2014/0277732 A1 | 9/2014 | Shiota et al. |
| 2020/0388997 A1 | 12/2020 | Bachler |
| 2022/0166197 A1 * | 5/2022 | Bach .................... B25J 15/0004 |

FOREIGN PATENT DOCUMENTS

| | | |
|---|---|---|
| DE | 4431254 A1 | 3/1996 |
| DE | 102012009649 A1 | 11/2013 |
| DE | 102015103444 A1 | 9/2016 |
| DE | 102018133337 A1 | 6/2020 |
| EP | 0259394 B1 | 8/1991 |
| EP | 0440955 B1 | 3/1995 |
| EP | 0924818 A2 | 6/1999 |
| EP | 0917259 B1 | 8/2001 |
| EP | 1447888 A1 | 8/2004 |
| EP | 2433760 A1 | 3/2012 |
| JP | S5781082 A | 5/1982 |
| JP | H0831538 A | 2/1996 |
| RU | 2108232 C1 | 4/1998 |
| SU | 1112458 A1 | 9/1984 |
| WO | WO-2018189103 A1 | 10/2018 |

* cited by examiner

GRIPPER FOR AUTOMATED WIRING

CROSS-REFERENCE TO RELATED APPLICATIONS

This application is a U.S. National Phase Application under 35 U.S.C. 371 of International Application No. PCT/DE2020/100034, filed on Jan. 17, 2020, which claims the benefit of German Application No. 10 2019 106 710.3, filed on Mar. 15, 2019. The entire disclosures of the above applications are incorporated herein by reference.

BACKGROUND OF THE INVENTION

This section provides background information related to the present disclosure which is not necessarily prior art.

FIELD OF THE INVENTION

The invention is based on a gripper for automated wiring of electrical components of an electrical switchgear, wherein the gripper comprises at least two gripper fingers. Such a gripper is known from U.S. Pat. No. 8,113,557 B2.

Description of Related Art including information disclosed under 37 CFR 1.97 and 1.98 In the production of switchgear and control systems, the wiring of electrical components is one of the central and most time-consuming work processes, which is still carried out mainly manually. Not only the high complexity of this work process, but above all the demand for one hundred percent faultlessness places great demands on the person carrying out the wiring.

For the optimization of the wiring process, there are various technical aids in different support levels. These range from hand tools and/or semi-automatic machines for cable assembly to fully automatic systems that completely assemble individual wires, i.e. cut to length, strip, apply ferrules and crimp. The pre-assembled cables produced in this way can then be output as loose and individual wires, as sequentially interconnected or strung wires, or as wire bundles.

A cable sequence wound onto a reel is known from DE 10 2015 103 444 A1. BE 101 965 1 A describes a multifunctional processing head integrated into the end effector of a wiring system. DE 44 31 254 A1 and EP 0 917 259 B1 each describe a method and a device for wiring connection points of components of electrical devices. EP 0 259 394 B1 describes a tool for laying cables.

WO 2018/189103 A1 shows a processing head as well as a system and a method for automated fitting of connector housings with cable elements. A gripper for a cable processing device is known from EP 1 447 888 A1. EP 0 440 955 B1 describes a device for automatic assembly of electrical conductors with contact parts in connector housings.

The subsequently published German patent application 10 2018 133 337.4 of Dec. 21, 2018 describes a method for wiring electrical components of an electrical switchgear arranged on a mounting plate with the aid of an articulated-arm robot, which has a gripper with two gripper fingers adjustable relative to one another at its end effector. To enable reliable handling of the flexible cables, a collaborative gripper system is proposed in which an articulated-arm robot with a gripper on each end effector holds one of the two opposite ends of the cable to be wired. However, these systems are correspondingly complex and thus complex and cost-intensive to deploy.

BRIEF SUMMARY OF THE INVENTION

This section provides a general summary of the disclosure, and is not a comprehensive disclosure of its full scope or all of its features.

It is one aspect of the invention to further develop a gripper of the type described above in such a way that it allows the handling of flexible cables and other wires with simple technical means for the purpose of wiring electrical switchgear.

Accordingly, the gripper is provided with the gripper fingers defining a cable guide corridor between them, the passage cross-section of which is defined at a distal end of the gripper fingers by opposing gripper jaws of the gripper fingers and further proximally with respect to the distal end by opposing cable drives of the gripper fingers. To vary the passage cross-section, it is provided that the two gripper fingers are linearly adjustable relative to each other via a linear adjustment unit in an adjustment direction that corresponds to a cross-sectional direction of the passage cross-section.

Due to the fact that the essential components of the gripper, namely the opposing gripper jaws for holding a cable, in particular a cable end, and the opposing cable drives of the gripper fingers themselves delimit the cable guide corridor and are linearly adjustable relative to each other via the linear adjustment unit for varying the passage cross-section of the cable guide corridor, the gripper according to the invention has a low complexity.

The gripper fingers can each be connected at their proximal end to an actuator of the linear actuator unit and extend perpendicular to a respective adjustment plane of the actuator.

It may be provided that at least one of the cable drives of at least one of the gripper fingers has at least one rotary drive. In this case, opposing rotary drives of the two gripper fingers can have an opposite direction of rotation. The two rotary drives can, for example, have at least two opposing pressure belts according to the principle of a belt press, which are aligned with respect to each other to form a roller gap. The rollers can also be adjacent to each other, insofar as no cable is accommodated between the rollers. The rolls preferably have an identical and opposite rotational speed at their outer circumference. In principle, the rotational drives are not limited to any particular embodiment as long as the aforementioned principle is achieved. Accordingly, it may be mentioned by way of example that the rotational drives may comprise at least one wheel, at least one roller and/or at least one conveyor belt. In particular, for example, a pair of opposing rotary drives may each comprise at least one wheel, at least one roller and/or at least one conveyor belt.

The opposing cable drives can be adjustable in the adjustment direction of the gripper fingers and mechanically pretensioned, preferably spring-pretensioned. In this way, it can be ensured that a uniform contact pressure is always exerted on the cable to be transported via the cable drives, irrespective of a processed cable cross-section, and thus a reliable static friction is provided between the cable and the cable drives. Likewise, it can be ensured in this way that when the gripper fingers are transferred from a cable acceptance position, in which the gripper jaws between them expand the passage cross-section beyond a cable cross-section and, if necessary, the cross-section of a cable end treatment, to a cable transport position, in which the gripper jaws between them limit the passage cross-section to a cable cross-section or a larger cross-section, which is preferably, however, smaller than the maximum cross-section of a cable end treatment, the cable drives are in contact with the cable and have the static friction to the cable which is required for driving the cable.

Particularly when processing long cables, it may be expedient to guide the cable picked up by the gripper away from the gripper in a controlled manner. For this purpose, in one embodiment, it can be provided that a cable guide is provided on a proximal cable outlet side of the opposing cable drives, which opens into the passage cross section. The cable guide may, for example, be an empty conduit. The cable outlet side can be a proximal opening of a roller gap formed between the two cable drives.

The opposing gripper jaws can each be adjustable about an axis extending in the adjustment direction. For example, the opposing gripper jaws can be adjusted in the same direction in an angular range of 0° to 180° between two adjustment positions, such as between two positions adjusted by 180° relative to each other about the axis. In particular, however, the gripper jaws can also be adjustable 5

The gripper jaws can each have a gripping end at their opposite longitudinal ends with respect to the axis, of which preferably in both of the positions adjusted by 180° with respect to each other one of the gripping ends has the distal end of its gripper finger and the other gripping end in each case faces the cable drives on an opposite side with respect to the axis. The gripper jaws are preferably symmetrical with respect to the axis. The opposing gripper jaws may be formed as complementary gripper jaws, in particular the opposing gripper jaws may have complementary interlocking contours. The interlocking gripper jaws can form between them the cable guide corridor with the passage cross-section, the passage cross-section being adjustable by adjusting the gripper fingers with the aid of the linear adjustment unit. It may be provided that even in a cable transport position, in which the gripper jaws between them limit the passage cross-section to a cable cross-section or a larger cross-section, which is preferably, however, smaller than the cross-section of a cable end treatment, the opposing complementary gripper jaws still partially engage one another, circumferentially limiting the cable guide corridor, so that a cable received between the gripper jaws in the cable guide corridor is securely held between the gripper jaws.

The linear actuator can be configured to selectively move the gripper fingers to at least one of the following positions relative to each other:
  a. a cable holding position in which the gripper jaws between them limit the passage cross-section to a cable cross-section, the cross-section of a cable end treatment or a smaller cross-section;
  b. a cable transport position in which the gripper jaws between them limit the passage cross-section to a cable cross-section or a larger cross-section, but preferably smaller than the cross-section of a cable end treatment; and
  c. a cable receiving position in which the gripper jaws between them extend the passage cross-section beyond a cable cross-section and, if necessary, a cable end treatment.

The gripper fingers can be adjusted relative to each other exclusively via the linear setting unit. This ensures a high level of process reliability.

According to another aspect, the invention relates to a robot, preferably an articulated-arm robot, such as known from the post-published German patent application 10 2018 133 337.4, comprising a gripper of the type previously described.

According to a still other aspect, the invention relates to a method for automated wiring of electrical components of an electrical switchgear, the method comprising:
  a. Removing an at least partially prefabricated cable from a cable transfer interface with the gripper and/or robot of the type described above;
  b. Contacting a first cable end of the cable at a first contact point of a first electrical component of the electrical switchgear, routing the cable from the first contact point to a second contact point of a second electrical component of the electrical switchgear, and contacting the second cable end at the second electrical contact point;
  wherein the removal of the cable from the cable transfer interface comprises:
  c. Transferring the gripper fingers via the linear actuator to a cable acceptance position in which the gripper jaws between them extend the passage cross-section beyond a cable cross-section of the cable and, if necessary, a cable end treatment of the cable;
  d. inserting the second cable end into the cable routing corridor via the distal end and the expanded passage cross-section of the gripper jaws until the second cable end reaches the cable drives; and
  e. Transport the cable with the cable drives into the cable guide corridor until the first cable end reaches the gripper jaws.

When the first end of the cable has reached the gripper jaws, it can be held by the gripper jaws and contacted at the first contact point of the first electrical components in the manner previously described. During the subsequent laying of the cable from the first contact point to the second contact point, the cable can exit the gripper again via the cable guide corridor, with the cable drive transporting the cable out of the cable guide corridor if necessary until the second cable end reaches the gripper jaws.

After laying the cable from the first contact point to the second contact point and before contacting the second cable end at the second electrical contact point, provision can be made for the opposing gripper jaws to be adjusted in the same direction and by 180° or, if necessary, another angular dimension between 0° and 360° in order to arrange the second cable end at the distal end of the gripper, so that the second cable end can be fed to a second electrical component and contacted at this.

Transporting the cable may comprise transferring the gripper fingers via the linear actuator from the cable receiving position to a cable transport position in which the gripper jaws between them limit the passage cross-section to a cable cross-section or greater, but preferably less than a maximum cross-section of a cable end treatment, so that the cable end can be passed between the gripper jaws.

Contacting the first and/or the second cable end may comprise transferring the gripper fingers via the linear actuator to a cable holding position in which the gripper jaws limit the passage cross-section between them to a cable cross-section, the cross-section of a cable end treatment or a smaller cross-section than this, so that the cable end is held between the gripper jaws.

Further areas of applicability will become apparent from the description provided herein. The description and specific examples in this summary are intended for purposes of illustration only and are not intended to limit the scope of the present disclosure.

BRIEF DESCRIPTION OF THE SEVERAL VIEWS OF THE DRAWINGS

The drawings described herein are for illustrative purposes only of selected embodiments and not all possible implementations, and are not intended to limit the scope of the present disclosure.

Further details of the invention are explained with reference to the figures below. Thereby.

DETAILED DESCRIPTION OF THE INVENTION

Example embodiments will now be described more fully with reference to the accompanying drawings.

Figure 1:
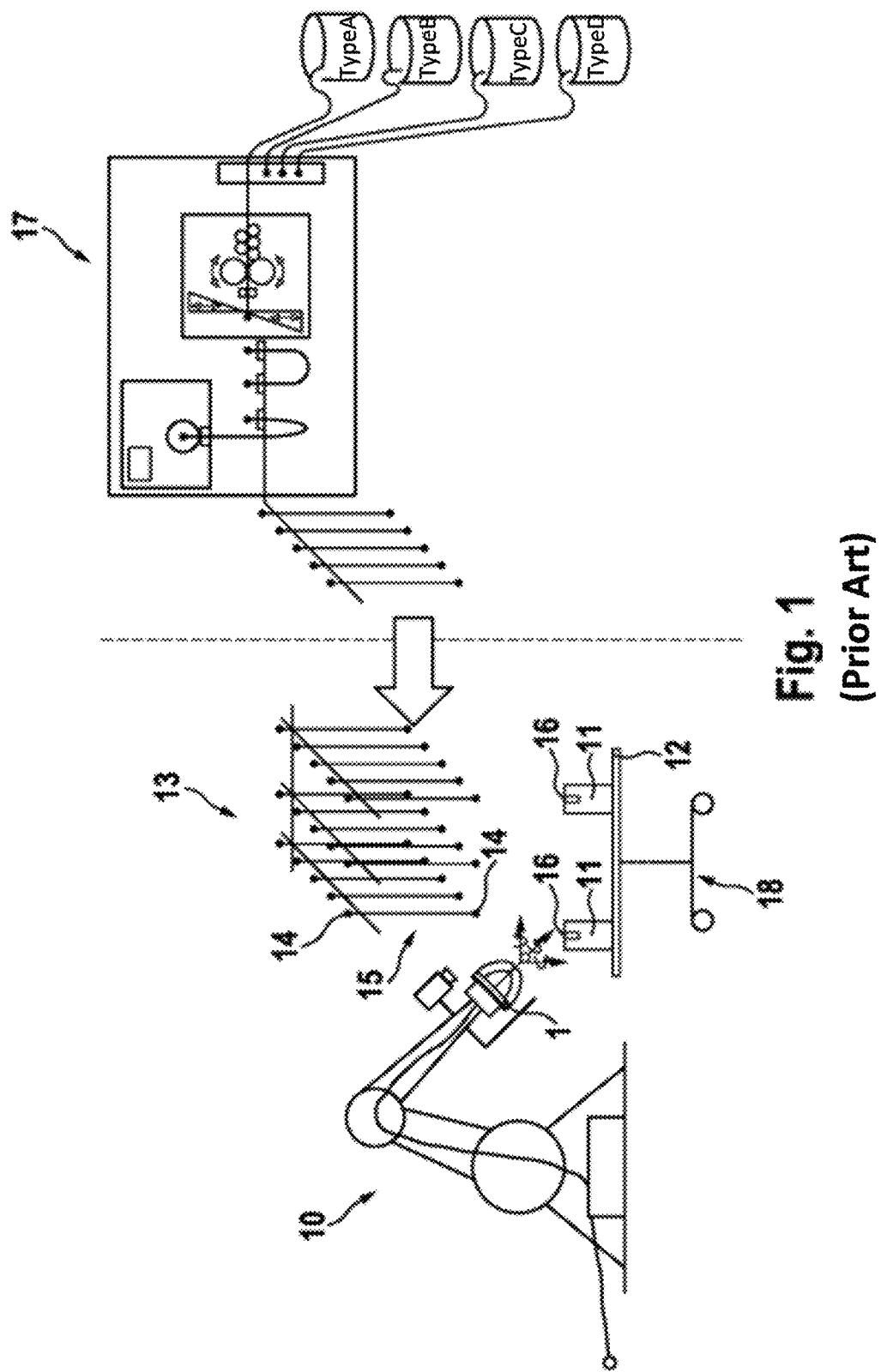
FIG. 1 shows an arrangement for the prefabrication and wiring of prefabricated cables with the aid of an articulated robot according to the state of the art.

FIG. 1 shows an exemplary arrangement for wiring electrical components 11 of an electrical switchgear system formed on a mounting plate 12. The mounting plate 12 is held horizontally by a transport carriage 18 so that the components 11 can be accessed from above by an articulated-arm robot 10 with a gripper 1 for the purpose of cable feed, contacting and, if necessary, quality assurance. Depending on the embodiment, the mounting plate 12 can alternatively be oriented at an angle to the horizontal.

The articulated arm robot 10 has an end effector with a gripper 1, via which pre-assembled cables 15 can be removed from a transfer interface 13 and fed to the components 11 for the purpose of contacting. The pre-assembled cables 15 can be produced with the aid of an automatic cable assembly machine 17, as is known in principle from the prior art.

In a first step, the robot 10 removes a first of the preassembled cables 15 from the interface 13 with the aid of its gripper 1 by grasping the cable 15 at one of its opposite preassembled cable ends 14. Thereupon, the held cable end 14 is fed to and contacted at a first contact point 16 of a first electrical component 11. After the first cable end 14 is contacted at the first contact point 16, the cable 15 is routed from the first contact point 16 to the second contact point 16 of a second electrical component 11 of the electrical switchgear and the second cable end 14 is contacted at the second electrical contact point 16.

The problem here is that the cable 15, as a flexible component, must be maneuvered during the contacting and laying of the cable 15 in such a way that the cable does not become entangled with the electrical components 11 of the electrical switchgear or other superstructures on the mounting plate 12. To achieve a high level of process reliability, it is therefore necessary to guide the cable precisely throughout the entire process sequence from the removal of the cable 11 from the interface 13 to the contacting of the second cable end at the second contact point 16 of the second component 11.

Figure 2:
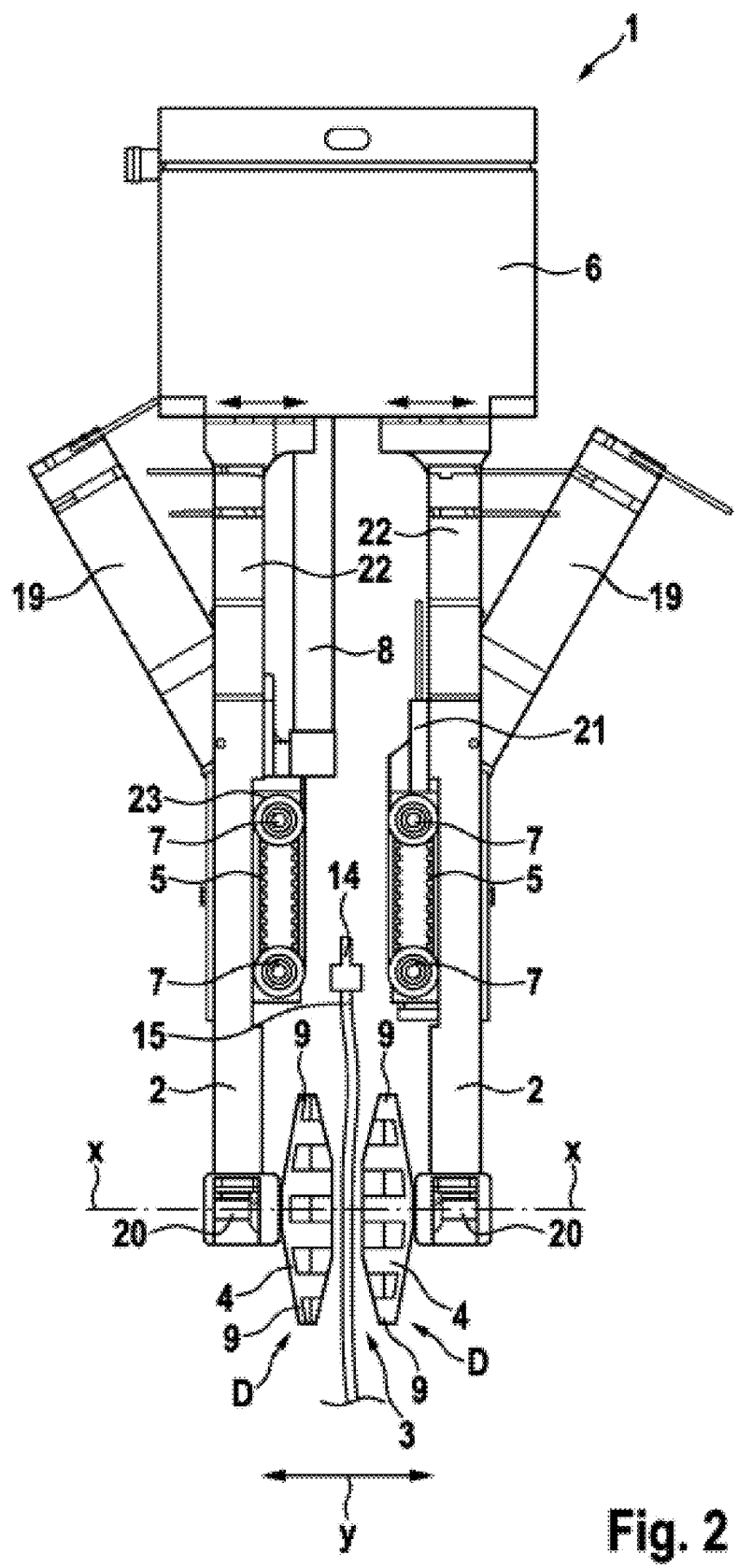
FIG. 2 shows a side view of an embodiment of a gripper according to the invention, which can be used, for example, as the gripper in the arrangement according to FIG. 1.
Figure 3:
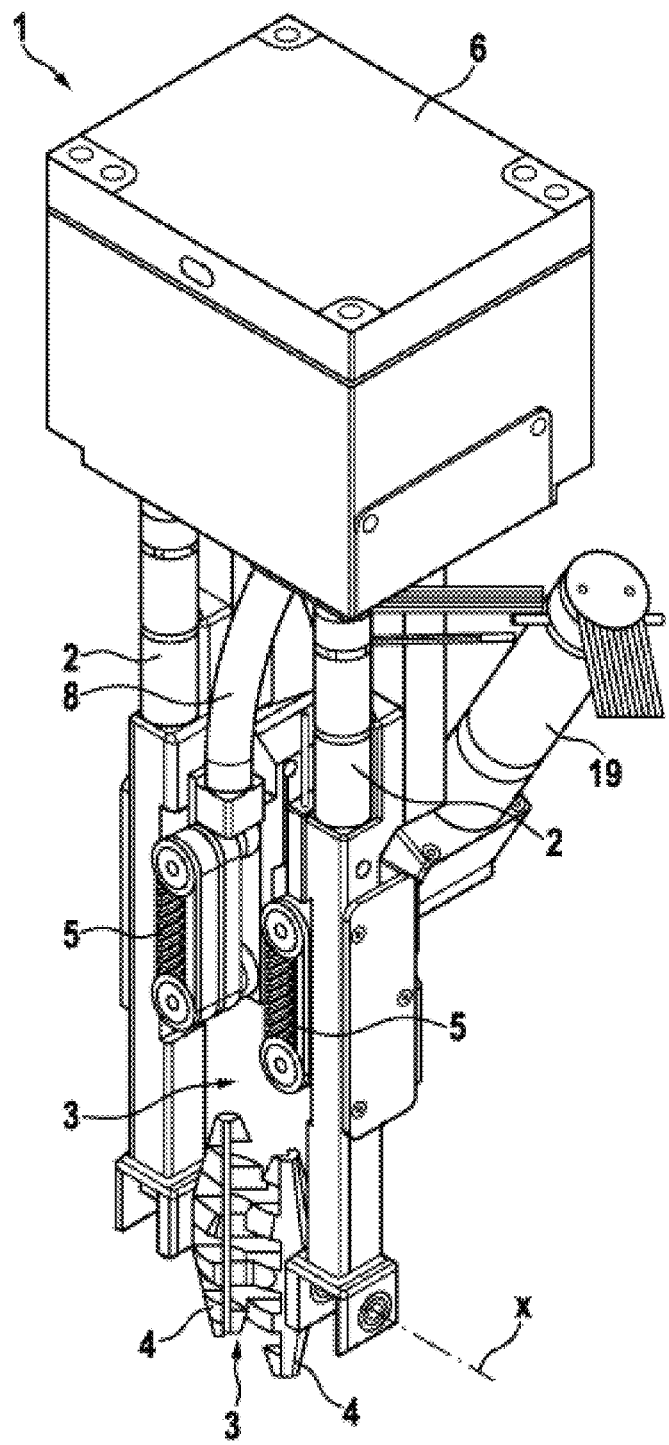
FIG. 3 shows a perspective view of the gripper according to FIG. 2.

To solve this problem, a gripper 1 is proposed according to the invention, as shown according to an exemplary embodiment in FIGS. 2 and 3. The gripper 1 has a first and a second gripper finger 2, which can be adjusted exclusively linearly with respect to one another via a linear adjustment unit 6, in such a way that they vary their distance from one another perpendicular to their longitudinal direction. A cable guide corridor 3 is formed between the gripper fingers 2, which is delimited on the one hand by complementary gripper jaws 4 on opposite sides of the gripper fingers 2 and on the other hand by opposing cable drives 5. At its proximal end, the corridor 3 opens into a cable guide 8, which can be designed, for example, as an empty tube, via which a cable inserted into the empty tube can be guided away from the gripper 1 in a process-safe manner.

The cable drives 5 are designed as opposing treadmills, each of which is clamped by a pair of rotary drives 7. Additional pressure rollers between the rotary drives 7 are also conceivable for optimum cable pressing. The rotary drives 7 can, for example, be designed as toothed wheels, with at least one of the two rotary drives 7 per cable drive 5 being driven via a motor 19. The running belts surrounding the gear wheels can be designed in the manner of a toothed belt with protrusions arranged on the inside, which engage in corresponding recesses of the gear wheels 7. The two cable drives 5 can be driven in opposite directions and at the same speed.

While in FIGS. 2 and 3 the gripper 1 is shown in a cable receiving position, in which the cross-section of the cable guiding corridor 3 is widened beyond a cable cross-section to allow insertion of a cable over the distal gripping ends D of the gripper jaws 4 to the cable drives 5, the gripper fingers 2 can be brought closer to each other via the linear drive 6, which tapers the passage cross-section of the cable guiding corridor 3. In a cable transport position, the gripper jaws 4 can limit the passage cross-section of the cable guide corridor 3 between them to a cable cross-section or slightly larger than this. In particular, it may be provided that in the cable transport position the passage cross-section is smaller than the cross-section of a cable end treatment, so that when a cable is transported through the cable guide corridor 3, which is tapered in the position described above, the cable comes to rest with its end-side wire end treatment against the distal end D of the gripper jaws 4.

For each gripper finger 2, the gripper 1 has a motor 19 for driving the cable drive 5 assigned to each gripper finger 2.

The opposing gripper jaws 4 can each be adjusted relative to one another about an axis x extending in the adjustment direction y of the gripper fingers 2. In particular, the gripper jaws 4 can be adjusted about the axis x in the same direction and between two positions about the axis x that are adjusted by 180° relative to each other by means of actuators 22, such as servomotors, each of which is coupled to one of the gripper jaws 4 via a spindle (not shown) that drives a gear unit 20. In this case, the gripper jaws 4 each have a gripping end 9 at their longitudinal ends opposite one another with respect to the axis x, of which, in both of the positions adjusted by 180° with respect to one another, in each case one of the gripping ends 9 has the distal end D of its respective gripper finger 2 and the respective other gripping end 9 faces the cable drives 5 on an opposite side with respect to the axis x. In relation to the axis x, the gripper jaws are each symmetrical.

The cable drives 5, in particular the rotary drives 7 of the cable drives 5, are coupled to a load sensor 21, with the aid of which it can be determined via an increasing load of the motors 19 driving the cable drives 5 that a cable end is located in the engagement area of the cable drives 5. For example, the cable end may have a cable end treatment that has a larger cross-section than the cable disposed between the cable drives 5, such that the cable end treatment comes into contact at a junction between the two cable drives 5 in the cable guide corridor 3 bounded between the cable drives 5 and represents a resistance that can be detected via a load increase. When the load sensor 21 has detected the load rise, the motors 19 can thereupon be controlled to stop driving the rotary drives 7.

Figure 4:
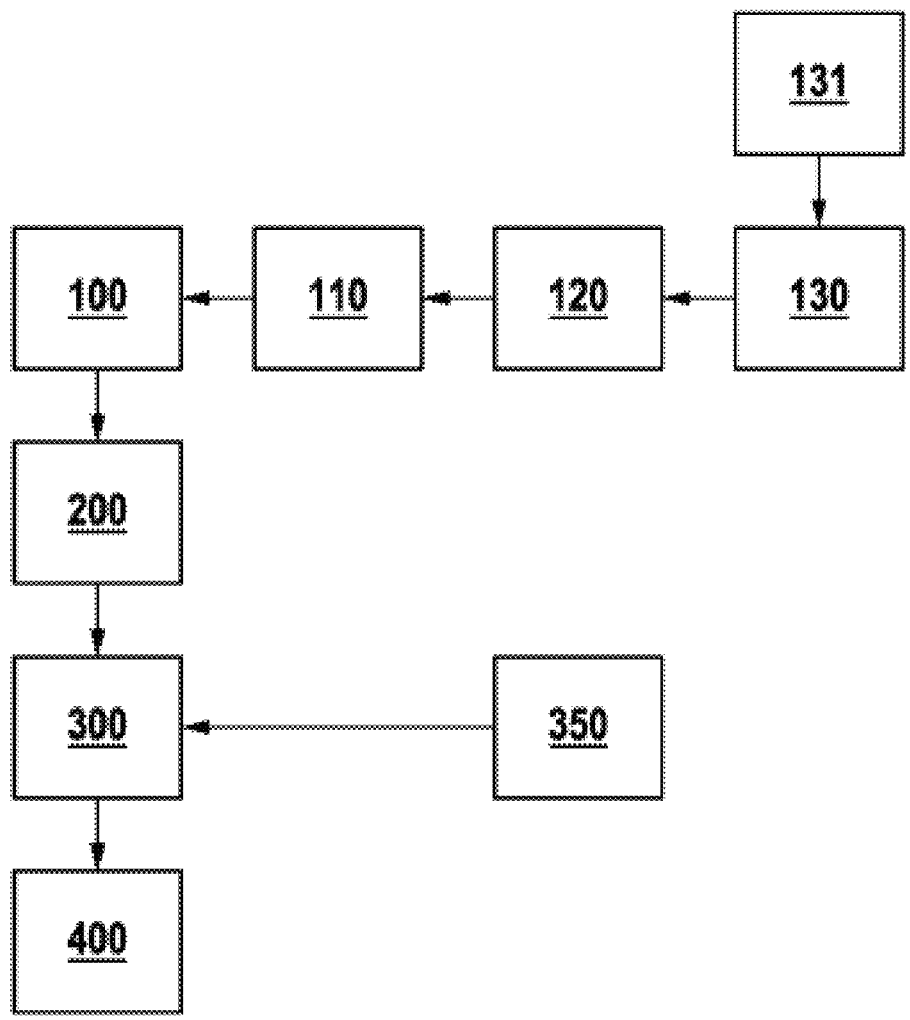
FIG. 4 shows a schematic flow diagram of a process according to the invention.

In the synopsis of FIG. 4 with FIGS. 1 to 3, a method according to the invention for automated wiring according to one embodiment of the invention is described. Accordingly, in a first step 100, the method comprises removing an at least partially pre-assembled cable 15 from a cable transfer interface 13 with the gripper 1 of a robot 10. In a subsequent step 200, the removed cable 15 can be contacted via its first cable end 14 at a first contact point 16 of a first electrical component 11 of the electrical switchgear. After contacting 200 the first cable end 14, the cable 15 may be routed from the first contact point 16 to a second contact point 16 of a second electrical component 11 of the electrical switchgear in a step 300. Thereafter, the second cable end 14 may be contacted at a second electrical contact point 16 in a step 400.

When the cable 15 is removed 100 from the cable transfer interface 13, in a step 110, the gripper finger 2 can be moved via the linear actuator 6 to a cable receiving position in which the gripper jaws 4 extend the passage cross-section between them beyond a cable cross-section of the cable 15 to be wired and beyond a cross-section of the cable end treatment of the cable 15. This allows, in a step 120, the second cable end 14 to be inserted into the cable routing corridor 3 via the distal end D of the gripper fingers 2 and the expanded passage cross-section of the gripper jaws 4 until the second cable end 14 reaches the cable drives 5. By actuating the cable drives 5, the cable can then be transported into the cable guiding corridor 3 in a step 130 until the first cable end 14 reaches the gripper jaws. The latter can be reproducibly detected in the manner described above with the aid of the load sensor 21.

The transporting 130 of the cable 15 may comprise transferring 131 the gripper fingers 2 via the linear actuating unit 6 from the cable receiving position to a cable transporting position, in which the gripper jaws 4 expand the passage cross-section between them to a cable cross-section or a larger cross-section than this, which, however, is smaller than the maximum cross-section of the cable end treatment, so that the cable 15 can be passed between the gripper jaws, but the cable end 14 with its larger end treatment, for example a wire end sleeve, comes to rest against the distal end D of the gripper jaws 4.

Contacting 200 the first and second cable ends may comprise transferring 131 the gripper fingers 2 via the linear positioning unit 6 to a cable holding position in which the gripper jaws 4 limit the passage cross-section between them to a cable cross-section, the cross-section of a cable end treatment, or a smaller cross-section, so that the cable end 14 is held between the gripper jaws 4.

The method may further comprise, after laying 300 of the cable 15 from the first contact point 16 to the second contact point 16 and before contacting 400 the second cable end 14 at the second electrical contact point 16, adjusting 350, in particular rotating the opposing gripper jaws 4 about the axis x in a concurrent manner and by 180°. This is necessary, in particular, in order to bring the second cable end 14, which rests against the gripper jaws 4 or is gripped by the gripper jaws 4, to the distal end D of the gripper 1, so that the second cable end 14, in particular the cable end treatment provided there, can be fed to the second contact point 16 of the second electrical component 11.

The features of the invention disclosed in the foregoing description, in the drawings as well as in the claims may be essential to the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A gripper for the automated wiring of electrical components of an electrical switchgear, the gripper comprising: at least two gripper fingers, wherein the at least two gripper fingers delimit a cable guide corridor between the at least two grippers, a passage cross-section of which is delimited at a distal end of the gripper fingers by opposing gripper jaws of the gripper fingers and, with respect to the distal end, further proximally by opposing cable drives of the gripper fingers, wherein a linear adjusting unit in an adjustment direction which corresponds to a cross-sectional direction of the passage cross-section configured to adjust the passage cross-section of the at least two gripper fingers to relative to one another.

2. The gripper according to claim 1, wherein at least one of the cable drives of at least one of the gripper fingers has at least one rotary drive, wherein rotary drives of the two gripper fingers which are located opposite one another have a direction of rotation in opposite directions.

3. The gripper according to claim 2, wherein at least one pair of opposing rotary drives comprises at least one wheel, roller or conveyor belt per rotary drive.

4. The gripper according to claim 1, wherein the opposing cable drives are adjustable in the adjustment direction of the gripper fingers and are mechanically pretensioned, preferably spring-pretensioned.

5. The gripper according to claim 1, further comprising a cable guide opening into the passage cross-section on a proximal cable outlet side of the opposing cable drives.

6. The gripper according to claim 1, wherein the opposing gripper jaws are each adjustable about an axis extending in the direction of adjustment.

7. The gripper according to claim 6, wherein the opposing gripper jaws configured to adjust in the same direction and between two positions about the axis with an adjustment in an adjustment range of 0°-180° relative to one another.

8. The gripper according to claim 7, wherein the gripper jaws each have a gripping end at longitudinal ends of the gripper jaws opposite to each other with respect to the axis, wherein in positions displaced with respect to each other, one of the gripping ends faces the distal end of its gripper finger and the other gripping end faces the cable drives at an opposite side with respect to the axis.

9. The gripper according to claim 1, wherein the linear actuator is attached the gripper fingers to selectively bring the gripper fingers into at least one of the following positions relative to each other:
   a. a cable holding position in which the gripper jaws between them limit the passage cross-section to a cable cross-section, or the cross-section of a cable end treatment, or less;

b. a cable transport position in which the gripper jaws between them limit the passage cross-section to a cable cross-section or to a cross-section greater than the cable cross-section, but preferably less than a cross-section of a cable end treatment; and
c. a cable receiving position in which the gripper jaws between them extend the passage cross-section beyond a cable cross-section and possibly a cable end treatment.

\* \* \* \* \*